July 2, 1940.  B. C. ROBERTSON  2,206,333
MOTION PICTURE FILM PRINTER
Filed July 11, 1938
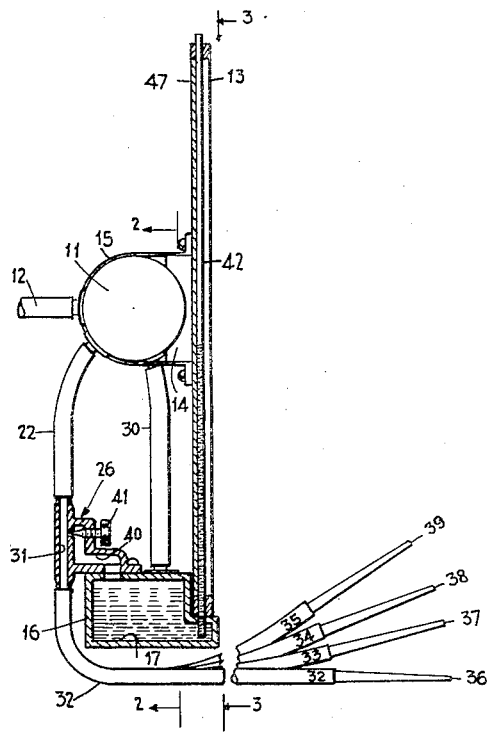
Fig. 1.
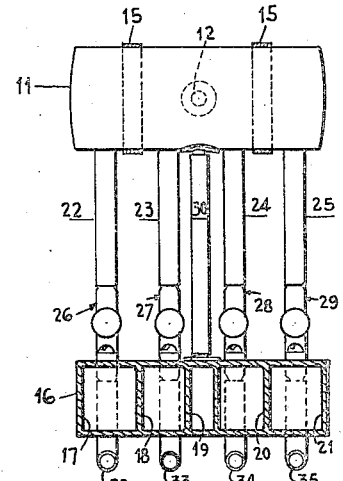
Fig. 2.
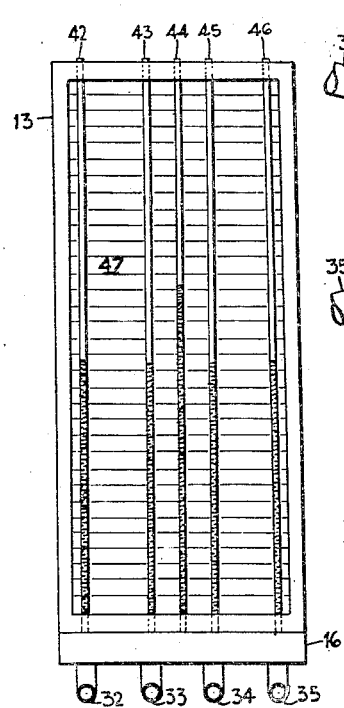
Fig. 3.
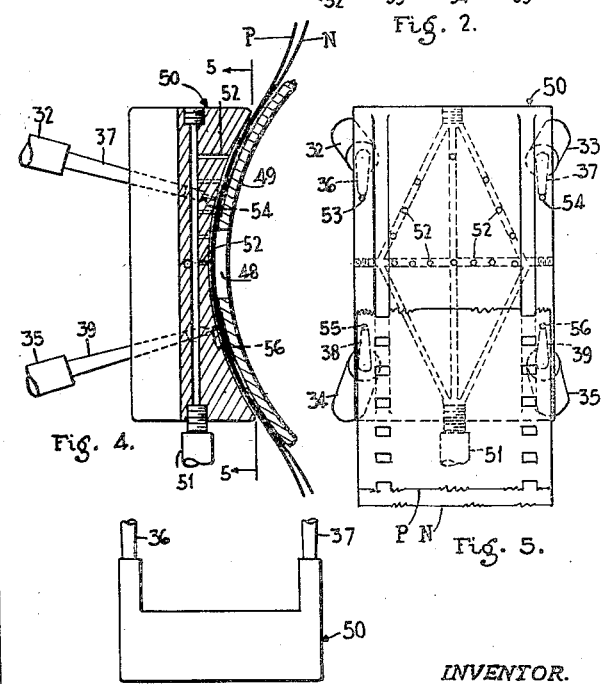
Fig. 4.
Fig. 5.
Fig. 6.
INVENTOR.
Benjamin C. Robertson
BY
ATTORNEY.

Patented July 2, 1940

2,206,333

UNITED STATES PATENT OFFICE 2,206,333

MOTION PICTURE FILM PRINTER

Benjamin Christian Robertson, North Hollywood, Calif., assignor to Twentieth Century-Fox Film Corporation, Los Angeles, Calif., a corporation of New York Application July 11, 1938, Serial No. 218,566

9 Claims. (Cl. 95—75)

This invention relates to the art of photographically printing motion picture films and deals particularly with means for indicating the position of the aperture gate in film printers of this type.

The invention to be hereinafter described has been developed and utilized in connection with a well known type of motion picture film printer and will be disclosed and described in conjunction therewith. However, it is not intended to limit the invention to this particular type of printer, inasmuch as it will become obvious, as the description proceeds, that it may be applied to other types.

The film printer under discussion employs a curved printing aperture over which the negative and the positive film are passed in unison and the two films are held in contact in passing the aperture by a curved aperture gate. In order to avoid film scratches from the aperture gate, and also to insure close contact of the two films, it is customary to hold the films away from the gate and at the same time press the two films together against the printing aperture by means of air pressure on the back of the positive film. This air pressure is ordinarily supplied through outlets in the face of the aperture gate. Under these conditions it has been found that the position of the aperture gate is highly critical and a certain fixed spacing of the aperture gate, with respect to the printing aperture and the film, must be maintained at all times to avoid scratches and insure proper contact printing conditions. My invention embodies means whereby the spacing of the aperture gate, with respect to the films passing over the aperture gate, may be accurately determined at a plurality of points on the aperture gate under running conditions. A means of this nature will enable the operator at all times to determine the exact spacing of the aperture gate and will indicate to him any change in the position of the gate that may be detrimental to the required conditions for proper contact printing.

Other objects and advantages will appear as the description proceeds in conjunction with the drawing, in which:

Figure 1 is an elevation, partly in section, of my space indicating device.

Figure 2 is a view taken on line 2—2 of Figure 1.

Figure 3 is a front elevation of my device taken on line 3—3 of Figure 1.

Figure 4 is a vertical section showing the printing aperture and the aperture gate in printing relation with my indicating device connected thereto.

Figure 5 is a view on line 5—5 of Figure 4.

Figure 6 is a top plan view of Figure 5.

Briefly stated, the invention embodies means for allowing air to escape on the back of the positive film in the space between the film and the aperture gate. The distance between the film and the gate will determine the amount of air that is allowed to escape. In practice I use four nozzles for escapement of the air and space these four nozzles on the gate so that an accurate indication of the position of the gate may be had at all times. In conjunction with the escape nozzles, I employ four separate pressure indicators which will visibly indicate the pressure on each point of escapement, which in turn indicates the amount of space between the aperture gate and the back of the film. The means for this purpose will now be described.

Referring to Figure 1, wherein I have illustrated a vertical elevation, partly in section, of the indicating end of my device, it will be seen that this particular part of the device comprises a tank 11 adapted to receive compressed air through a supply conduit 12. The pressure in the tank 11 will be determined by practice and ordinarily is of a low order. The tank 11 is mounted upon a frame 13 by means of brackets 14 and straps 15. The frame 13 is mounted upon a closed container 16, said container being formed with separate compartments 17, 18, 19, 20 and 21. The compartments 17, 18, 20 and 21 are connected to the tank 11 by means of conduits 22, 23, 24 and 25, which communicate with by-pass needle valves, generally designated 26, 27, 28 and 29 respectively. The compartment 19 is directly connected to the tank 11 through a conduit 30. The valves 26, 27 and 28 are identical and a description of one will serve for all. In Figure 1, I have shown a section of the valve 26. Here it will be observed that the valve comprises a passage 31, which communicates the conduit 22 directly with a lower conduit 32. It is to be understood that there is a lower conduit for each of the valves; namely, 33, 34 and 35, which connect with the valves 27, 28 and 29 respectively. As shown, these conduits are each equipped with a tip 36, 37, 38 and 39, respectively, the purpose of which will become obvious later. The valve 26 is formed with another passage 40, which communicates with the compartment 17 and also with the passage 31. The needle valve 41 is arranged to control the amount of air by-passed from passage 31 to the compartment 17. The purpose of this needle is to adjust the air pressure on the indicating device, which will be explained later. In use, the compartments 17, 18, 19, 20 and 21 are filled with a heavy liquid, such as mercury, and each compartment is provided with a gauge tube, preferably glass, designated 42, 43, 44, 45 and 46 respectively. These gauge tubes are carried upright in the frame 13 and are mounted in front of an index board 47.

Referring now to Figures 4, 5, and 6, wherein I have illustrated how the above mentioned device is operably connected to the aperture gate, it will be seen in Figure 4 that I have shown a printing aperture 48 in a fragmentary part 49 of a printer. It will be noted that the element 49 is curved, which is customary practice in film printers of this type. Over the aperture 48 there is positioned a printer gate, generally designated 50, said printer gate being also curved to fit the curvature of the aperture plate. Between the aperture gate and the printing aperture a positive film P and negative film N are passed in contact relation. In order to obtain good contact printing, it is necessary that the positive P and the negative N be held in close contact with emulsion to emulsion and that both films in turn are held against the printing aperture 48. The means for holding the films together and against the aperture 48 ordinarily comprises air pressure. For this purpose air is admitted into the aperture gate 50 by means of a conduit 51 and is distributed over the face of the gate through outlet ports designated 52. It will be noted that these outlet ports are distributed over the face of the aperture gate and are arranged to apply pressure on the back of the positive film at a point in advance of the exposure aperture. This can be observed in Figures 4 and 5. The aperture gate is also provided with additional outlet ports 53, 54, 55 and 56, said ports being a part of this invention and being arranged above and below the printing aperture and near the outside edge of the gate. Air is supplied to the ports 53, 54, 55 and 56 by inserting the tips 36, 37, 38 and 39 respectively into holes in the back of the gate leading to the said ports, as shown in Figure 4. In Figure 4 it will be observed that the aperture gate 50 is spaced from the back of the positive film P, which permits that the films run past the printing aperture with a clearance from the aperture gate. In practice the clearance between the aperture gate and the films is very small and is highly critical and must be maintained at a very definite fixed amount in order to insure that the films have the proper contact pressure and are properly held against the printing aperture. The outlet ports 53, 54, 55 and 56 are for the purpose of determining the amount of clearance. It will be seen that when air pressure is applied to these ports the spacing between the films and the face of the aperture gate will determine the amount of air that is permitted to escape. This will in turn control the pressure brought upon the liquid in the compartments 17, 18, 20 and 21, which will be indicated by the height of the liquid in the gauge tubes 42, 43, 45 and 46 respectively. It can thus be seen that the amount of air escaping through each of these ports will be accurately indicated, which will indicate the spacing of the gate at each of these four points. In addition to the four indicating gauge tubes, I have shown a fifth gauge tube; namely, 44, which is directly connected to the pressure in the tank 11. This tube will show the actual pressure brought upon the liquid in the compartments without any air escaping against the film and the difference between the height of the liquid in this tube and the other tubes will actually indicate the amount of spacing between the aperture gate and the films.

In operation, the four tips 36, 37, 38 and 39 are connected to the four outlet ports 53, 54, 55 and 56 respectively on the aperture gate, as described, and air pressure is admitted to the tank 11 through the conduit 12. The tube 44 will indicate the normal pressure in the tank. The difference in the height of the liquid in the tubes 42, 43, 45 and 46, compared to the tube 44, will indicate how much spacing there is between the films and the gate at these respective points and may be read directly from the index board 47 which may be calibrated in any units. A determination of the spacing of the gate may be made under standing conditions or an accurate determination of the spacing may be had under running conditions. A device of this character will enable the operator to set his gate before beginning a run and will also enable him to check his gate at any time during running conditions.

I claim:

1. In a film printer having a printing aperture, an aperture gate spaced from said printing aperture, to permit film to pass therebetween, said gate having a plurality of air ports arranged to permit compressed air to escape between said gate and said film at variously disposed points on said gate, and means associated with each of said ports for indicating the spacing of said gate with respect to said film at said points by the escapement of air between said gate and said film.

2. The elements of claim 1, wherein said means includes a common source of compressed air supply and separate means for conducting compressed air from said common source to each of said ports.

3. In a film printer having a printing aperture, an aperture gate spaced from said printing aperture to permit film to pass therebetween, said gate having a plurality of air ports arranged to permit compressed air to escape between said gate and said film at variously disposed points on said gate, and means associated with each of said ports for indicating the spacing of said gate with respect to said film at said points by the escapement of air between said gate and said film, said means including a common source of compressed air supply, separate means for conducting compressed air from said common source to each of said ports, and means for indicating the pressure in each of said air conducting means.

4. The elements of claim 3 and, in addition thereto, means for indicating the pressure in said common source.

5. The elements of claim 3, wherein said last mentioned means includes a container having separate compartments for each of said air conducting means with liquid therein, a substantially upright gauge tube entering said liquid in each of said compartments, and means for by-passing compressed air from each of said air conducting means into its associated compartment to force liquid into its respective tube.

6. In a film printer having a printing aperture, an aperture gate spaced from said printing aperture to permit film to pass therebetween, said gate having a plurality of air ports arranged to permit compressed air to escape between said gate and said film at variously disposed points on said gate, and means associated with each of said ports for indicating the spacing of said gate with respect to said film at said points by the escapement of air between said gate and said film, said means including a common source of compressed air supply, separate means for conducting compressed air from said common source to each of said ports, and means for indicating the pressure in each of said air conducting means, said last mentioned means including a container having separate compartments, with liquid therein, connected to each of said air conducting means, a substantially upright gauge tube entering said liquid in each of said compartments, means for by-passing compressed air from each of said air conducting means into its associated compartment to force liquid into its respective tube, and a valve in each of said by-pass means for regulating the pressure upon the liquid in each compartment to control the height of liquid in each respective tube.

7. The elements of claim 6 and, in addition thereto, a common index board for indicating the height of liquid in all of said tubes.

8. The elements of claim 6 and, in addition thereto, a separate compartment in said container having a gauge tube associated therewith for indicating the normal pressure in said common source of compressed air supply.

9. In a film printer having a printing aperture, an aperture gate spaced from said printing aperture to permit film to pass therebetween, said gate having an air port disposed near each corner of said gate to permit compressed air to escape between said gate and said film, and means associated with each of said ports for indicating the spacing of said gate with respect to said film at said variously located points.

BENJAMIN CHRISTIAN ROBERTSON.